United States Patent [19]

Kyrtsos et al.

[11] Patent Number: 5,082,071
[45] Date of Patent: Jan. 21, 1992

[54] METHOD AND APPARATUS FOR MONITORING PAYLOAD

[75] Inventors: Christos T. Kyrtsos; Dean A. Worrell, both of Peoria, Ill.

[73] Assignee: Caterpillar Inc., Peoria, Ill.

[21] Appl. No.: 570,081

[22] Filed: Aug. 20, 1990

[51] Int. Cl.$^5$ ............... G01G 19/40; G01G 19/08; G01G 19/10
[52] U.S. Cl. ................ 177/25.14; 177/139; 177/141
[58] Field of Search ............. 177/139, 141, 146, 147, 177/25, 14

[56] References Cited

U.S. PATENT DOCUMENTS 4,055,255 10/1977 Vasquez ........................... 214/2
4,230,196 10/1980 Snead ............................. 177/141
4,919,222 4/1990 Kyrtsos et al. ................... 177/139

*Primary Examiner*—George H. Miller, Jr.
*Attorney, Agent, or Firm*—Steven R. Janda

[57] ABSTRACT

In many applications, it is important to measure and display payload weight for a loader vehicle. The subject apparatus and method senses only the hydraulic pressure of a lift cylinder. The payload weight is computed by curve fitting the sensed cylinder pressure to a second order time dependent polynomial and comparing the time dependent polynomial to one of a series of predetermined second order geometric polynomials. The weight computation algorithms used in the payload monitor are applicable to a number of work vehicles having at least one work implement linkage and at least one hydraulic cylinder for modifying the linkage geometry.

14 Claims, 4 Drawing Sheets

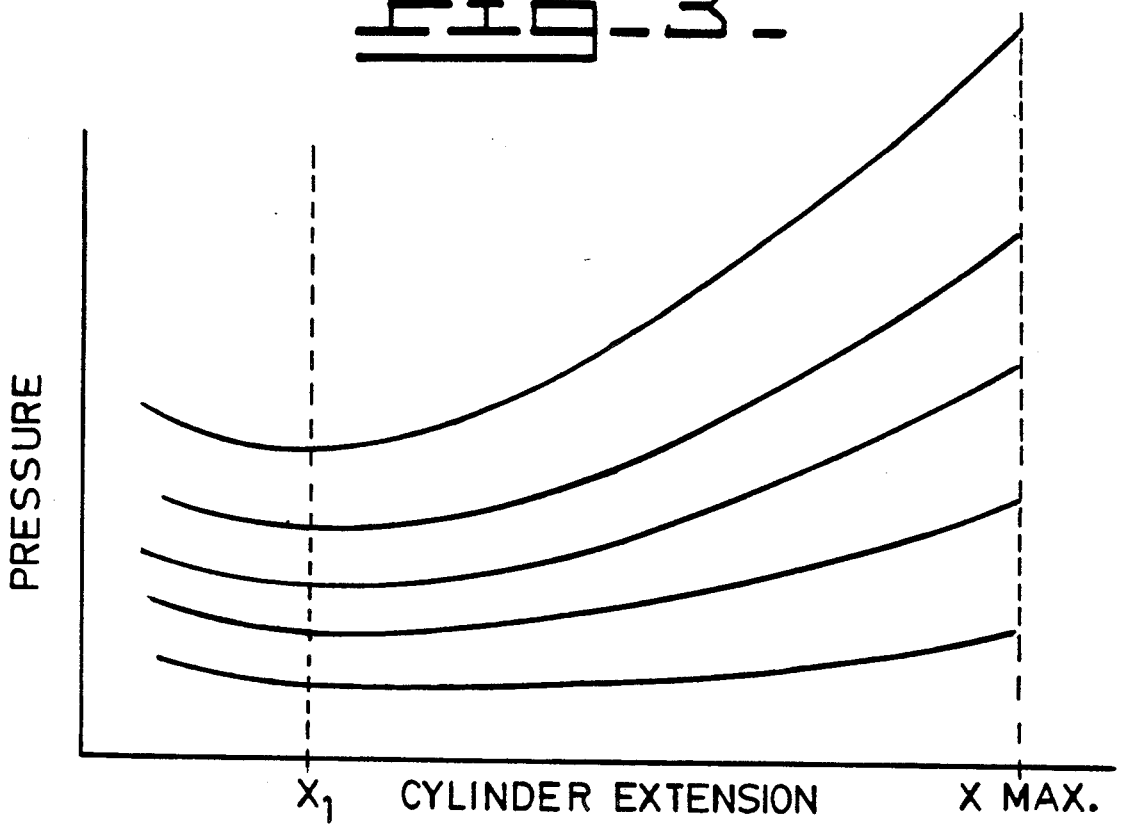
Fig-3-
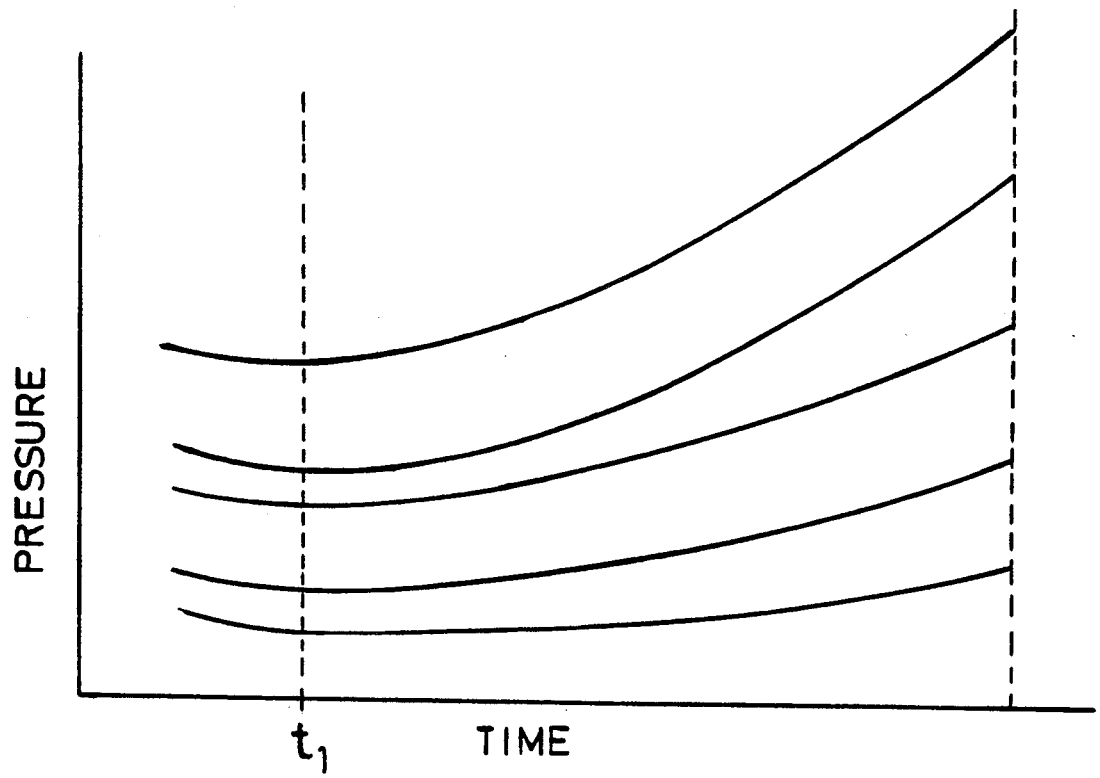
Fig-4-

METHOD AND APPARATUS FOR MONITORING PAYLOAD

DESCRIPTION

1. Technical Field

This invention relates generally to vehicles for transferring bulk material and, more particularly, to an apparatus and method for weighing and indicating the weight of the bulk material being transferred.

2. Background Art

Vehicles such as loaders are used generally to transfer bulk material from a stock pile onto transport vehicles such as trucks or railroad cars. In such vehicle loading applications, it is desirable that the transport vehicles are loaded to, but not over, their maximum rated legal capacity. Underloading causes inefficiency in the material hauling cycle and underutilization of the transport vehicles. Overloading causes additional maintenance cost and extra wear on the truck tires and suspension system. Furthermore, the overloaded material may need to be unloaded to decrease load weight, causing additional expense.

Payload measurement is also desirable as a measure of the material hauling operation productivity. The ability to accumulate the weight of the material loaded during a single shift, during a twenty-four hour period, or during any other time period is valuable to an operations manager.

A number of payload measuring devices have been developed. One such device is described in U.S. Pat. No. 4,230,196, issued to Snead on Oct. 28, 1980. Snead discloses a load weighing and accumulating system for a loader. Snead's device includes a pressure sensor for detecting the hydraulic pressure in the lift cylinder of the loader, and a lift arm alignment member which provides a visual aid to the operator to facilitate positioning the lift arm at a predetermined weighing location. To measure the load in the loader bucket, the operator positions the lift arm by visually aligning the alignment members on the lift arm and the vehicle frame. Following a time delay, the load is weighed.

This device has several disadvantages. The amount of data sampled in one-half second is small and results in inaccurate measurements. This is especially significant when the vehicle is operating over rough terrain. The lift cylinder pressure rises when the vehicle hits a bump, and drops when the vehicle experiences "free fall" as it clears the bump. The same sharp pressure deviations occur when the vehicle encounters a surface depression, except the pressure first decreases then increases.

In a typical loader operation environment, the ground surface is uneven. The Snead device requires that the vehicle dynamics be at a steady state when the data sampling is taking place, which is not possible when the vehicle is traveling. Weighing accuracy is severely compromised because of the small data sampling window. The Snead device also requires that the operator maintain the position of the lift arm while measurement is taking place. This requirement has two implications. Because the cylinder pressure can vary over a large range depending on the lift arm position, if the operator fails to align the lift arm, the resultant payload measurement may be grossly erroneous. In addition, requiring the operator to stop the lift arm and position it with the alignment members interrupts the operator's pace and disrupts the loading process.

Another device, disclosed in U.S. Pat. No. 4,055,255 issued to Vasquez on Oct. 25, 1977, describes an apparatus and method for carrying and delivering payload of a predetermined weight. The Vasquez device senses hydraulic pressure in the supporting the bucket. Because of the peculiar configuration of the vehicle implement linkage, the lift cylinder of the bucket is generally upright except when the bucket is lowered to obtain a load. Therefore, the Vasquez device is a special application payload weighing device not suitable for use on loaders having different and more conventional linkage configurations.

Yet another device, disclosed in U.S. Pat. No. 4,919,222 issued to Kyrtsos et al. on Apr. 24, 1990, describes an apparatus and method for weighing and indicating the weight of bulk material being transferred by a loader. In addition to sensing the hydraulic pressure in the lift cylinders, this apparatus also senses lift cylinder extension. Reference data is first obtained in a calibrating operation that includes sensing the pressure and extension during the lift phase of a work cycle when the loader bucket is first empty and then fully loaded. Subsequent data from an unknown payload is then compared to the reference data to obtain an indication of the weight of the unknown payload. While this apparatus provides accurate information, operator productivity could be improved by eliminating the calibrating operation. In addition, if the number of sensors are reduced, reliability is improved, and costs and warehousing needs are reduced.

The present invention is directed to overcoming one or more of the problems set forth above.

DISCLOSURE OF THE INVENTION

The invention avoids the disadvantages of known payload measurement systems and provides a payload monitor that is accurate, that does not alter or interfere with the operator's loading operation, and that is installable on existing or new loaders without linkage reconfiguration.

In one aspect of the present invention, a method for measuring and indicating payload weight for a vehicle having at least one lift cylinder for elevating a payload carrier is disclosed. The method includes the steps of sensing the lift cylinder hydraulic pressure, deriving a second order time dependent polynomial representation of the sensed pressure, comparing the time dependent polynomial to a geometric polynomial and calculating an actual payload weight from the comparison.

In another aspect of the invention, an apparatus for measuring and indicating payload weight for a vehicle having at least one lift cylinder for elevating a payload carrier is disclosed. The apparatus comprises a device for sensing the lift cylinder hydraulic pressure and a device for calculating the actual payload weight in response to the sensed pressure.

The invention also includes other features and advantages which will become apparent from a more detailed study of the drawings and specification.

BRIEF DESCRIPTION OF THE DRAWINGS

FIG. 3 is a graphical representation of lift cylinder pressure versus displacement;

FIG. 4 is a graphical representation of lift cylinder pressure versus time; and

BEST MODE FOR CARRYING OUT THE INVENTION

Figure 1:
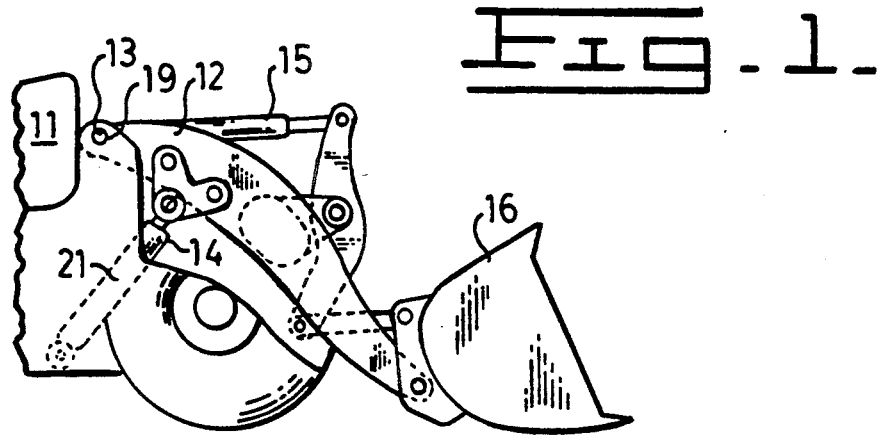
FIG. 1 is a side view of the forward portion of a loader vehicle.

In FIG. 1 a payload monitoring system is generally represented by the element number 10. Although FIG. 1 shows a forward portion of a wheel type loader vehicle 11 having a payload carrier in the form of a bucket 16, the present invention is equally applicable to vehicles such as track type loaders, and other vehicles having similar loading implements. The bucket 16 is connected to a lift arm assembly 12, which is pivotally actuated by two hydraulic lift cylinders 14 (only one is shown) about a pair of lift arm pivot pins 13 (only one is shown) attached to the vehicle frame. A pair of lift arm load bearing pivot pins 19 (only one is shown) are attached to the lift arm assembly and the lift cylinders 14. The bucket 16 can also be tilted by a bucket tilt cylinder 15.

A pressure transducer 21 senses the hydraulic pressure in one of the lift cylinders 14. Although there are two lift cylinders 14, the pressure in each of the cylinders 14 is generally the same for a given payload and given lift arm geometry. Thus, sensing pressure at one of the cylinders 14 is sufficient for the present application.

Figure 2:
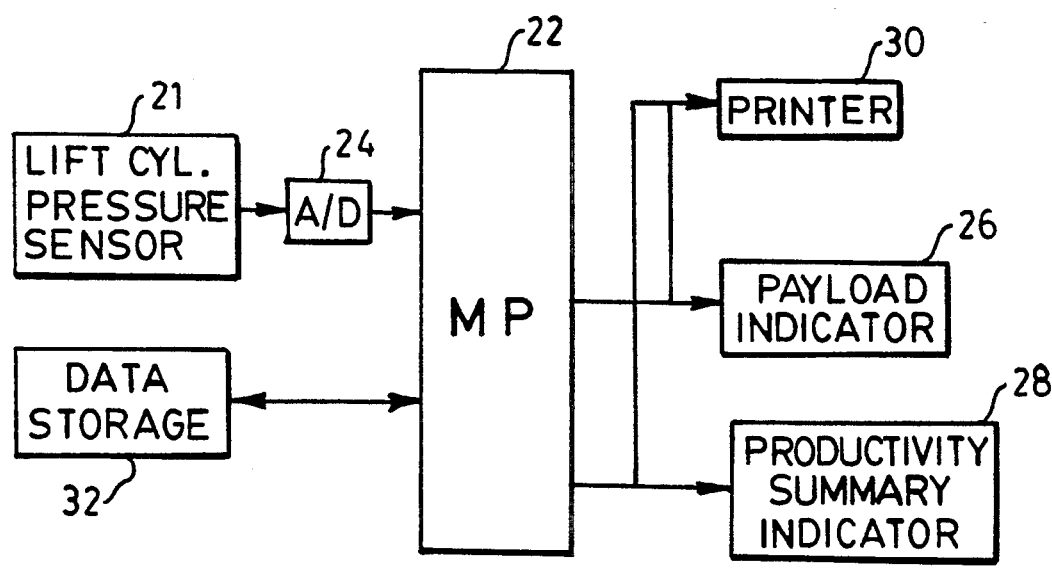
FIG. 2 is a block diagram of an embodiment of the present invention.

Referring to FIG. 2, the pressure transducer 21 produces an analog signal in response to the magnitude of the hydraulic pressure in the lift cylinder 14. An analog-to-digital (A/D) converter connected to and between the pressure transducer and a microprocessor 22 converts the analog pressure signal to a digital pressure signal that is read by the microprocessor 22. A payload weight indicator 26 is connected to the microprocessor 22 and displays the measured payload weight based on computations made by the microprocessor 22. A productivity indicator 28 is provided to indicate the amount of material loaded by the vehicle 11 in a preselected amount of time. The preferred embodiment includes a memory device 32 and a printer 30 that produces hard copy reports.

Referring now to FIGS. 3 and 4, the relationship between the pressure versus time characteristic and the pressure versus lift cylinder extension characteristic is shown. The shape of each curve corresponds to a graphical representation of a second order polynomial over the range of interest of time and extension. As shown, the bottom curve in each graph corresponds to conditions in which the bucket 16 is empty, and the uppermost curve in each graph corresponds to having the maximum rated payload in the bucket 16. Each curve located in a progressively higher location on the graph corresponds to a progressively greater payload.

Since both the pressure versus time and the pressure versus extension characteristics can be expressed as second order polynomials, if the pressure versus time characteristic corresponding to a given payload is known, then the pressure versus extension characteristic corresponding to the same payload can be determined. The derivation of the pressure versus extension polynomial, however, is only possible if velocity is assumed to be constant over the differential amount of time of interest. Advantageously, the duration of time of interest is on the order of one-tenth of a second. During such a small time frame, physical constraints prevent the lift cylinder pressure from changing significantly. Even though a very small sampling time is used, accurate results are obtained by fitting a plurality of samples to a second order polynomial.

The derivation can best be understood in connection with the following equations:

$$P = at^2 + bt + c \quad dP/dt = 2at + b \qquad (1)$$

where
P is lift cylinder pressure;
t is time;
a, b, and c are constants; and
dP/dt is the slope of the pressure versus time characteristic.

$$P = dx^2 + ex + f \quad dP/dx = 2dx + e \qquad (2)$$

where
P is lift cylinder pressure;
x is lift cylinder extension;
d, e, and f are constants; and
dP/dx is the slope of the pressure versus extension characteristic.

$$V = dx/dt = (dP/dt)/(dP/dx) \qquad (3)$$

where
V = velocity of lift cylinder extension

Pressure versus time characteristics are determined empirically by fitting data points obtained from the pressure transducer 21 to a second order polynomial by using an error minimizing technique, preferably least squared error. Pressure versus extension characteristics for a preselected number of discrete known payloads are determined experimentally for the vehicle incorporating the present invention and are stored in the memory device 32. The number of pressure versus extension characteristics chosen is based on the range of possible payloads and the degree of accuracy desired. While lift cylinder extension is preferably the independent variable, other variables that indicate changes in loader geometry, such as lift arm pivot pin 13 rotation, can be used.

If velocity is assumed to be constant, then:

$$(2at_1 + b)/(2dx_1 + e) = V = (2at_2 + b)/(2dx_2 + e) \qquad (4)$$

Therefore, if the data corresponding to point 1 is known and the slope of the pressure versus time characteristic at that point is known, this data can be compared to the pressure versus extension characteristics of known payloads to determine if any of the known extension characteristics include points that will satisfy equation (4). This procedure is repeated for each point along the pressure versus time characteristic. The pressure versus extension characteristic that includes the most points which satisfy equation (4) corresponds to the preselected payload weight that is nearest to the actual weight of the payload in the bucket 16.

Figure 5:
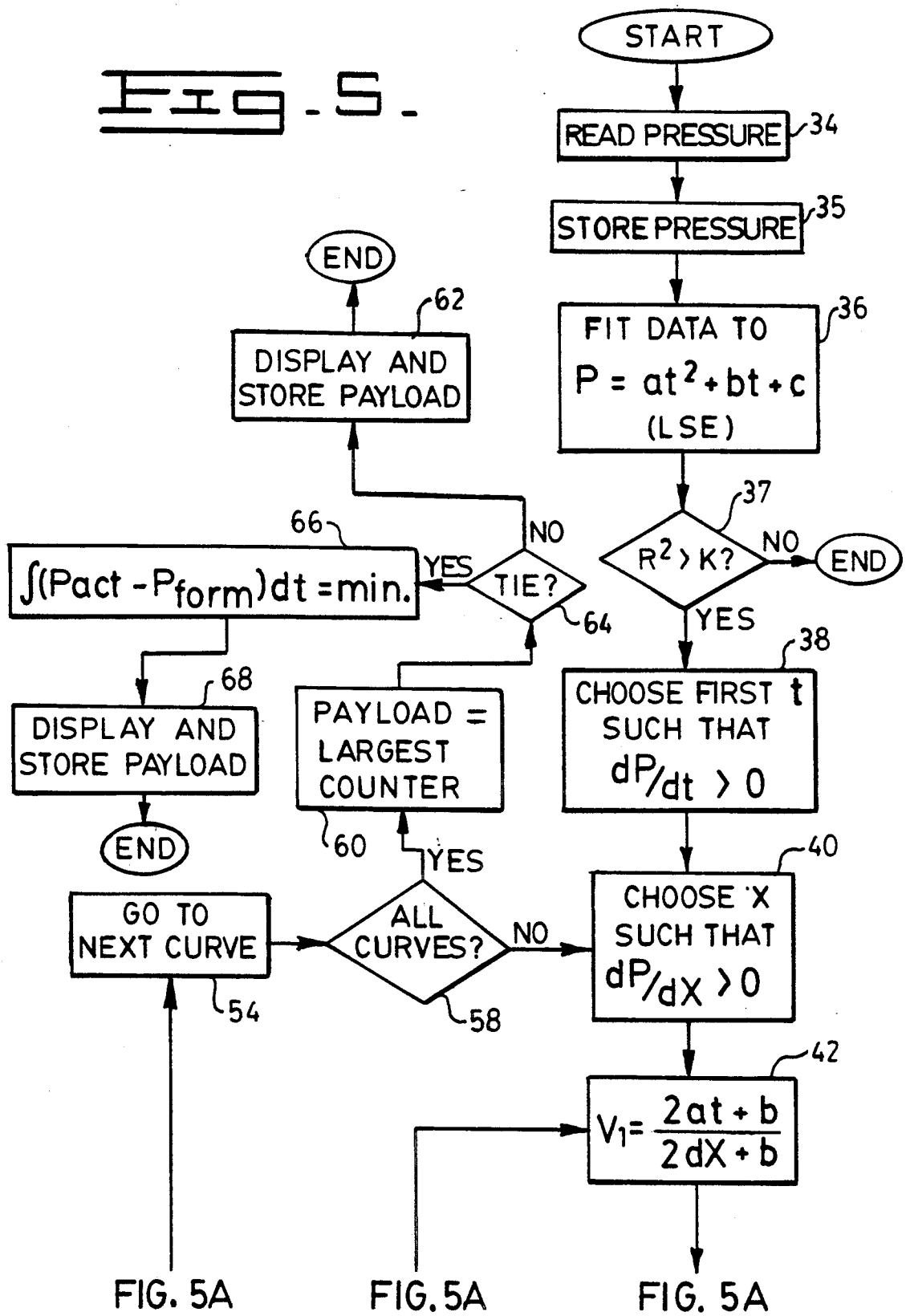
FIGS. 5 and 5A illustrate a flow chart of an algorithm used in the embodiment of FIG. 2.
Figure 5A:
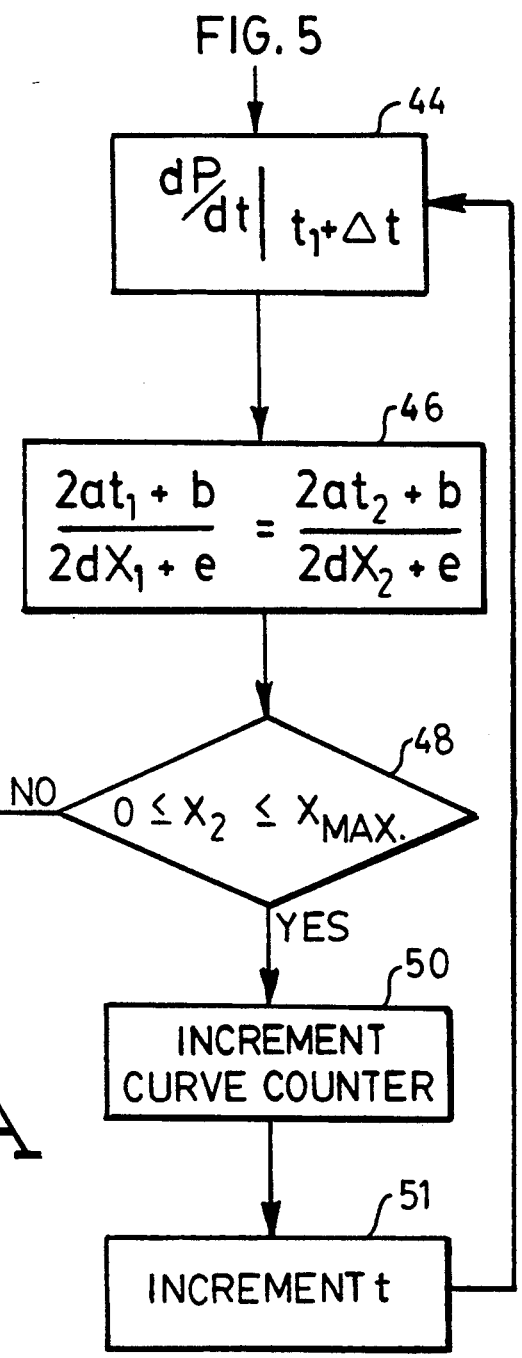

Referring now to the algorithm shown in FIGS. 5 and 5A, a detailed view of the steps embodied by the present invention is shown. Pressure signals from the pressure transducer 21 are sampled and stored in the memory device 32 at a predetermined rate. The time between samples is advantageously on the order of one-tenth of a second, however, the chosen rate is a matter of design choice. A preselected number of stored pressure signals are used to derive a second order polynomial expressing cylinder pressure as a function of time 36. Typically a least squared error technique is used, but other methods can be used.

As is well known in the art, an $R^2$ value obtained from the least squared error technique is a good indication of the degree to which the derived function explains changes in the actual data. In this application, therefore, there is a positive relationship between the $R^2$ value and the degree to which the actual pressure versus time characteristic is parabolic.

In typical applications, the loader vehicle 11 performs four distinct operations: digging, lifting, carrying, and dumping. The present invention only provides accurate indications of payload during the lifting phase. The lifting phase is unique in that the pressure versus time characteristic is parabolic. Therefore, the lifting phase can be identified by the $R^2$ value exceeding a predetermined constant 37. If the $R^2$ value does not exceed the predetermined constant, the loader is not performing the lifting operation and the algorithm is exited.

If the $R^2$ value exceeds the predetermined constant, the smallest time value is chosen 38 at which the slope of the pressure versus time characteristic is greater than zero. The smallest extension value is chosen 40 at which the slope of the pressure versus extension characteristic is greater than zero. As is seen by referring to equation (3), this is the first point at which the velocity of the bucket 16 is greater than zero. The velocity of the bucket is found 42 by using equation (3), the actual pressure versus time characteristic and the predetermined pressure versus extension characteristic corresponding to an empty bucket 16.

Referring to equation (4), $t_2$ is equivalent to $t_1$ plus the sampling time. Since all other variables are known, $x_2$ is easily determined 46. If $x_2$ is between zero and a maximum extension value 48, a counter is incremented 50. A separate counter exists in the memory device 32 for each pressure versus extension characteristic. The value stored in the counter indicates the number of points on each pressure versus extension characteristic that correspond to points on the pressure versus time characteristic. The next point on the pressure versus time curve is then compared to the pressure versus extension characteristic by incrementing t at block 51 and returning to block 44. The pressure versus extension characteristic corresponding to the next higher payload weight is then retrieved from memory 54. If each of the preselected pressure versus extension characteristics have not been compared to the pressure versus time characteristic 58, then the extension value is chosen 40 at which the slope of the current pressure versus extension characteristic is greater than zero and the algorithm continues as previously set forth.

If the $x_2$ value is not in the specified range, the $x_1$ value is incremented by a differential amount. If the incremented $x_1$ value is less than the maximum extension value 56, then the velocity of the bucket is determined 44 and the algorithm continues as previously set forth. If the incremented $x_1$ value is greater than the maximum extension value 56, then the pressure versus extension characteristic corresponding to the next higher payload weight is then retrieved from memory 54. If each of the preselected pressure versus extension characteristics have not been compared to the pressure versus time characteristic 58, then the extension value is chosen 40 at which the slope of the current pressure versus extension characteristic is greater than zero and the algorithm continues as previously set forth.

If each of the preselected pressure versus extension characteristics have been compared to the pressure versus time characteristic 58, then the pressure versus extension characteristic having the largest counter value is chosen 60 and the payload weight corresponding thereto is displayed and stored 62 in the memory device 32. The algorithm is then exited.

If there are more than one pressure versus extension characteristics having the same counter value 60, then the characteristic is chosen that minimizes 66 the following expression:

$$\int (P_{act} - P_{form}) dt \qquad (5)$$

where
$P_{act}$ is an actual pressure versus characteristic that is determined from the pressure and extension data derived by the present invention; and
$P_{form}$ is, a pressure versus time characteristic corresponding to one of the preselected pressure versus extension characteristics.

The payload weight corresponding to the pressure versus extension characteristic that minimizes equation 5 is the predetermined payload weight that is nearest to the actual payload weight. The minimizing payload weight is displayed and stored 68 in the memory device 32. The algorithm is then exited.

Industrial Applicability

The operation of an embodiment of the present invention is best described in relation to its use in loading applications where knowledge of payload weight is important. This payload measurement system is also valuable in operations where it is desirable to monitor loader vehicle productivity.

A typical work cycle of a loader 11 includes, sequentially: digging and/or crowding a stock pile, racking back the bucket 16 to maintain the load, travelling to a dump site or a transport vehicle while raising the bucket 16, and finally dumping the load from a raised position. This loading cycle is not interrupted by the use of the instant invention, because it automatically determines when the vehicle is in the lifting phase. Furthermore, the instant invention does not require the operator to stop the lift at a predetermined location nor does it require the operator to lift the bucket 16 above a predetermined location.

The present invention is also expandable to other vehicles by compensating for different linkage configurations. Anticipated applicable vehicle types are excavators, front shovels, backhoe loaders, and any vehicles having at least one linkage with at least one hydraulic cylinder for modifying that linkage configuration. For these vehicle linkage configurations, additional pressure sensors may be needed to detect cylinder pressure in a plurality of lift cylinders during the work cycle. However, the basic payload weight calculation remains the same.

Any specific values used in the above descriptions should be viewed as exemplary only and not as limitations. Other aspects, objects, and advantages of this invention can be obtained from a study of the drawings, the disclosure, and the appended claims.

We claim:

1. A method for dynamically measuring and indicating payload weight for a vehicle having at least one lift cylinder for elevating a payload carrier, said vehicle generally executing a work cycle including lifting said payload carrier, said method comprising the steps of:

sensing hydraulic pressure in said lift cylinder during said work cycle;

delivering a plurality of signals in response to said sensed pressure;

deriving a second order time dependent polynomial representation of said plurality of signals;

comparing said time dependent polynomial to at least one of a plurality of second order geometric polynomial representations of known payload weights; and calculating an actual payload weight in response to said comparison.

2. A method, as set forth in claim 1, wherein said time dependent polynomial deriving step includes using an error minimizing technique to fit a predetermined number of said signals to a second order equation.

3. A method, as set forth in claim 1, wherein said lift cylinder extends to elevate said payload carrier, and said geometric polynomial represents a relationship between said sensed pressure and said extension of said lift cylinder.

4. A method, as set forth in claim 3, wherein said comparing step includes comparing ratios of a rate of change in said sensed pressure with respect to time and a rate of change in said lift cylinder extension with respect to time.

5. A method, as set forth in claim 1, wherein said lift cylinder pressure sensing step is performed only during the payload lifting portion of said work cycle.

6. A method, as set forth in claim 1, wherein the vehicle includes a memory device storing said plurality of geometric polynomial representations.

7. A method, as set forth in claim 6, wherein said plurality of geometric polynomial representations are empirically determined.

8. An apparatus for dynamically measuring and indicating payload weight for a vehicle having at least one lift cylinder for elevating a payload carrier, said vehicle generally executing a work cycle including lifting said payload carrier, comprising:

means for sensing said lift cylinder hydraulic pressure during said work cycle;

means for delivering a plurality of signals in response to said sensed pressure;

means for deriving a second order time dependent polynomial representation of said plurality of signals;

means for comparing said time dependent polynomial to at least one of a plurality of second order geometric polynomial representations of known payload weights; and means for calculating an actual payload weight in response to said comparison.

9. An apparatus, as set forth in claim 8, wherein said time dependent polynomial deriving means includes using an error minimizing technique to fit a predetermined number of said signals to a second order equation.

10. An apparatus, as set forth in claim 8, wherein said lift cylinder extends to elevate said payload carrier, and said plurality of geometric polynomials represent a relationship between said sensed pressure and said lift cylinder extension.

11. An apparatus, as set forth in claim 10, wherein said comparing means compares ratios of a rate of change in said sensed pressure with respect to time and a rate of change in said lift cylinder displacement with respect to time.

12. An apparatus, as set forth in claim 8, wherein said means for delivering a plurality of signals delivers said signals only during the payload lifting portion of said work cycle.

13. An apparatus, as set forth in claim 8, including a memory device for storing said plurality of geometric polynomial representations.

14. An apparatus, as set forth in claim 13, wherein said plurality of geometric polynomial representations are empirically determined.

* * * * *